(12) United States Patent
Aubel et al.

(10) Patent No.: US 6,921,197 B2
(45) Date of Patent: Jul. 26, 2005

(54) METHOD AND SYSTEM FOR MEASURING TEMPERATURE AND MONITORING VEHICLE TIRE OPERATION, AND VEHICLE TIRE AND METHOD FOR INTRODUCING A TEMPERATURE SENSOR INTO A VEHICLE TIRE

(76) Inventors: Thomas Aubel, Gartenstr. 5, D-83607 Holzkirchen (DE); Markus Berkmüller, Waldhauserstr. 11, D-82061 Neuried (DE); Reinhard Möbius, Sonnenblumenstr. 36, D-81337 München (DE); Bernhard Schick, Mosalberstr. 23, D-76199 Karlsruhe (DE); Thomas Ziegler, Eschentr. 88, D-85716 Unterschleissheim (DE)

( * ) Notice: Subject to any disclaimer, the term of this patent is extended or adjusted under 35 U.S.C. 154(b) by 0 days.

(21) Appl. No.: 10/190,946

(22) Filed: Jul. 8, 2002

(65) Prior Publication Data

US 2003/0021330 A1 Jan. 30, 2003

(30) Foreign Application Priority Data

Jul. 24, 2001 (DE) .......................... 101 35 883
Nov. 19, 2001 (DE) .......................... 101 56 776

(51) Int. Cl.⁷ .......................... G01M 17/02; G01K 3/04
(52) U.S. Cl. .......................... 374/141; 374/120; 374/208; 374/57; 73/146
(58) Field of Search .......................... 374/142, 141, 374/143, 153, 120, 208, 45, 57; 340/870.17, 501, 539.27; 29/595; 152/151, 195, 197, 450; 73/146

(56) References Cited

U.S. PATENT DOCUMENTS

| | | | | |
|---|---|---|---|---|
| 3,931,619 A | * | 1/1976 | Moore et al. | 73/116 |
| 4,542,466 A | * | 9/1985 | Arimatsu | 700/199 |
| 4,570,152 A | * | 2/1986 | Melton et al. | 340/449 |
| 5,063,774 A | * | 11/1991 | Burkard et al. | 73/146.5 |
| 5,071,259 A | * | 12/1991 | Metzger et al. | |
| 5,348,067 A | | 9/1994 | Myatt | |
| 5,352,038 A | * | 10/1994 | Schmidt et al. | |
| 5,513,525 A | * | 5/1996 | Schurmann | |
| 5,663,496 A | * | 9/1997 | Handfield et al. | |
| 5,749,984 A | * | 5/1998 | Frey et al. | |
| 5,864,056 A | * | 1/1999 | Bell et al. | 73/146 |
| 5,939,977 A | * | 8/1999 | Monson | |
| 6,062,072 A | * | 5/2000 | Mock et al. | 73/146.5 |
| 6,255,940 B1 | * | 7/2001 | Phelan et al. | 340/447 |
| 6,278,361 B1 | * | 8/2001 | Magiawala et al. | 340/438 |
| 6,286,992 B1 | * | 9/2001 | Kyrtsos | |
| 6,533,010 B1 | * | 3/2003 | Alonso et al. | 152/419 |
| 6,561,018 B2 | * | 5/2003 | Mancosu et al. | 73/146 |

(Continued)

FOREIGN PATENT DOCUMENTS

| | | | |
|---|---|---|---|
| DE | 877 263 | 4/1953 | |
| DE | 32 47 371 | 6/1984 | |
| DE | 3445286 A1 | * 6/1986 | |
| DE | 692 23 899 | 9/1994 | |
| DE | 199 24 830 | 11/2000 | |
| GB | 2088607 A | * 6/1982 | G08B/21/00 |

OTHER PUBLICATIONS

Article, Rubber Chemistry & Technology, American Chemical Society.

*Primary Examiner*—Gail Verbitsky
(74) *Attorney, Agent, or Firm*—Robert W Becker & Associates; Robert W Becker (57) ABSTRACT

A vehicle tire is provided that contains at least one temperature sensor embedded in the tire in a critical location, and a transmission unit for transferring the output signal of the temperature sensor to a location externally of the vehicle tire. A method is also provided for precisely measuring the temperature of a vehicle tire with such a temperature sensor. A method is also provided for monitoring the operation of the vehicle tire.

29 Claims, 4 Drawing Sheets

U.S. PATENT DOCUMENTS

| | | | |
|---|---|---|---|
| 6,581,657 B1 * | 6/2003 | Brown | 152/152.1 |
| 6,704,636 B2 * | 3/2004 | Amano et al. | 701/80 |
| 6,706,132 B2 * | 3/2004 | Coffin | 156/87 |
| 6,813,947 B2 * | 11/2004 | Dollinger et al. | 73/432.1 |
| 2001/0008083 A1 * | 7/2001 | Brown | 73/146 |
| 2001/0022802 A1 * | 9/2001 | Kurata | |
| 2002/0092364 A1 * | 7/2002 | Adderton et al. | |
| 2002/0097040 A1 * | 7/2002 | Takizawa et al. | 324/174 |
| 2003/0201044 A1 * | 10/2003 | Schick | 152/152.1 |
| 2004/0007302 A1 * | 1/2004 | Hamilton et al. | 152/416 |
| 2004/0108723 A1 * | 6/2004 | Mancosu et al. | 290/1 R |
| 2004/0164854 A1 * | 8/2004 | Nantz et al. | 340/443 |

* cited by examiner

METHOD AND SYSTEM FOR MEASURING TEMPERATURE AND MONITORING VEHICLE TIRE OPERATION, AND VEHICLE TIRE AND METHOD FOR INTRODUCING A TEMPERATURE SENSOR INTO A VEHICLE TIRE

BACKGROUND OF THE INVENTION

The present invention relates to a method and a system for the measurement of the temperature of a vehicle tire. The present invention furthermore relates to a method for monitoring the operation of a vehicle tire. In addition, the present invention relates to a vehicle tire and a method for introducing a temperature sensor into a vehicle tire.

Vehicle tires are subjected to considerable stresses during operation. In addition to the environmental influences due to gases, light and liquids, as well as mechanical stresses, for the service life of a tire of critical significance is the tire inflation pressure, in other words, the air pressure that is present within the tire. In particular too low of an air pressure leads to excessive flexing of the tire, as a result of which the tire temperature, especially in the region of the tire shoulder, at the transition between the tread surface and the sidewall, is increased. A high temperature damages not only the tire rubber itself, but also its connection with the carcass and further tire inserts, for example a belt. A recognition of the temperature of the tire, especially region, therefore makes it possible to have a determination about the state of the tire and possible damage thereto.

It is therefore an object of the present invention to provide a method for the measurement of the temperature, especially for the direct measurement of the temperature of the rubber of a vehicle tire. It is furthermore an object of the present invention to provide a method according to which the operation of a vehicle tire, especially with regard to possible damage, can be monitored. It is another object of the present invention to provide a vehicle tire, the operational reliability of which can be monitored.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

The method of the present invention for measuring the temperature of a vehicle tire includes the steps of embedding at least one temperature sensor in a critical location of the vehicle tire, and transmitting an output signal of the temperature sensor to an evaluation unit.

Pursuant to further specific features of the inventive method, the output signal that is delivered by the temperature sensor that is embedded in the tire can be transmitted without contact or via contacts to the evaluation unit.

To monitor the operation of a vehicle tire by measuring the tire temperature as described above, the output signal of the temperature sensor is evaluated in the evaluation unit with regard to its magnitude and/or its trend with respect to time. The output signal, or a function that is dependent upon the output signal, can be integrated in the evaluation unit, the value of the integral can be stored, and a wear signal can be indicated if the value of the integral exceeds a predetermined threshold value. Pursuant to one specific embodiment, the output signal, or a temperature that is dependent upon the output signal, is integrated only if the temperature detected by the temperature sensor is above a threshold temperature value.

Pursuant to an alternative method, to monitor the operation of a vehicle tire by measuring the tire temperature as described above, the output signal of the temperature sensor can be evaluated in the evaluation unit, and a tire inflation pressure can be increased if the tire temperature exceeds a predetermined value at predetermined driving conditions.

The inventive system for monitoring the operation of a vehicle tire basically contains a vehicle tire having a temperature sensor embedded in a critical location of the vehicle tire, and a transmission device for transmitting the output signal of the temperature sensor to an evaluation device which evaluates the output signal with respect to magnitude and duration and produces a warning signal if the magnitude of the output signal and/or a value composed of the magnitude and duration of the output signal exceeds a predetermined threshold value.

The vehicle tire of the present invention contains at least one temperature sensor that is embedded in it at a critical location, and a transmission device for transmitting the output signal of the sensor to a location externally of the vehicle tire.

The temperature sensor can be embedded in the rubber of the tire in the vicinity of the tire shoulder. In addition, the temperature sensor can be connected with a transponder that is embedded in the tire, and the output signal of which is a function of the temperature of the temperature sensor. In such a case, the temperature sensor can be integrated in the transponder, which can store tire-specific data. The transponder can be embedded in the tire at a location close to the tire bead. Furthermore, the temperature sensor can be connected via electrical lines embedded in the tire with contacts that are exposed for contact with contacts provided on a rim.

Pursuant to an advantageous method of the present invention for the introduction of a temperature sensor into a vehicle tire, a channel is formed in the rubber of the tire, with the channel proceeding from a first location of the tire surface, through the tire rubber to a measurement location near the tire belt and/or the carcass in the region of the tire shoulder, and from there to a second location of the tire surface that is spaced from the first location. A tube is then introduced into the channel, with a temperature sensor being introduced into the tube in such a way that the temperature sensor is disposed in the region of the measurement location. The tube is then removed from the channel while the temperature sensor is held securely in place, and the channel, with the temperature sensor disposed therein, is then closed off. Such a method is particularly suitable for the subsequent mounting of the temperature sensor. The channel on the whole advantageously extends in the longitudinal direction of the tire.

Further specific features of the present invention will be described in detail subsequently.

DESCRIPTION OF PREFERRED EMBODIMENTS

Figure 1:
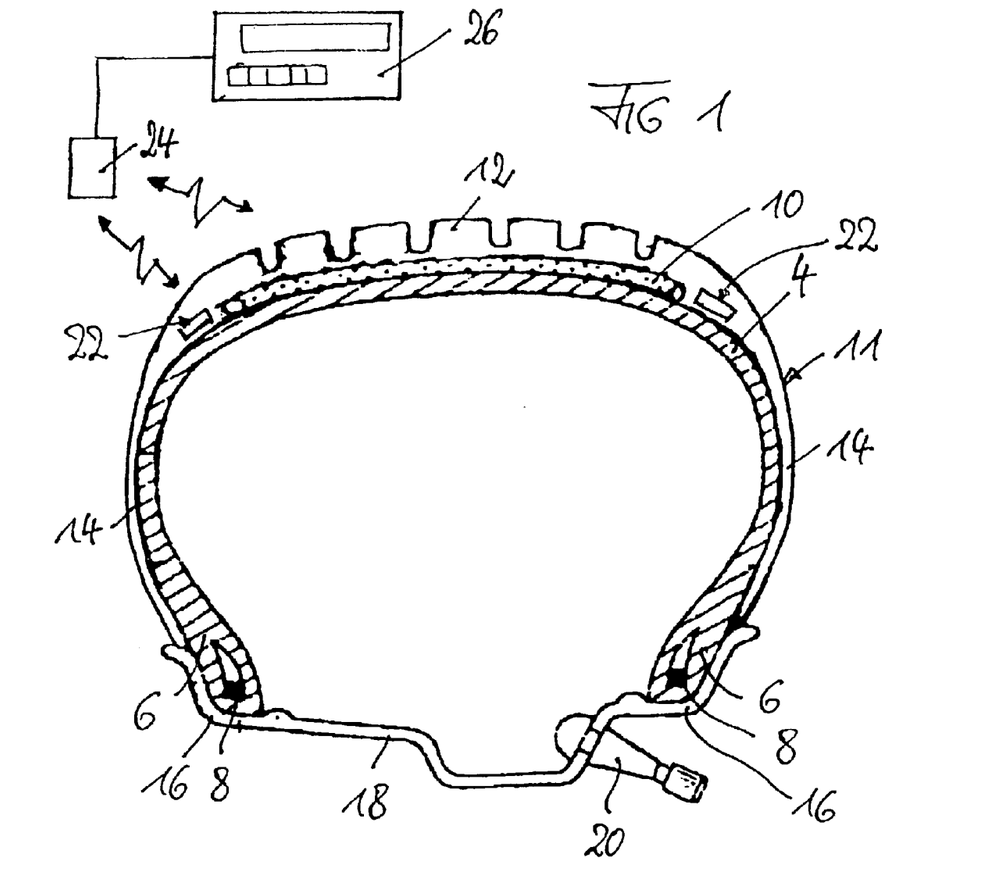
FIG. 1 is a cross-sectional view through the upper half of a vehicle tire.

Referring now to the drawings in detail, FIG. 1 shows a cross-section through a tire of radial-ply construction that is provided with a carcass 4, which is composed, for example, of two radially extending plies of rayon cords, and ends radially inwardly in beads 6. To stabilize the beads 6, cores 8 are embedded in their radially inner end regions. Disposed on the radially outer portion of the carcass 4 is a belt 10 that is comprised, for example, of two crossed plies of steel cords, and two circumferential plies of nylon cords. Vulcanized over the carcass 4 or the belt 10 is a rubber layer 11 that in the radially outer region forms the tread strip 12 and in the side portion forms relatively thin side strips or sidewalls 14.

The beads 6 are received in shoulders 16 of a rim 18, which in turn is connected with a non-illustrated wheel well. The tire has an airtight construction, so that the interior of the tire can be supplied with compressed air via a valve 20 that is disposed in the rim.

The tire construction described above is known, and will therefore not be explained in greater detail. It should also be noted that the construction is shown by way of example only. The present invention can also be utilized with tires having a different construction.

The stress on the tire is particularly great in the transition region from the relatively flexible sidewalls into the rigid region of the tread surface, since at that location, especially if the tire is underinflated or is otherwise subjected to high mechanical deformation, for example when being operated at an incline or angle, so that as the tire rides on the roadway deformations occur, as a result of which the material of the tire is heated up. Such heating can damage the rubber material itself and can lead to separations between the rubber and the belt or the carcass.

Therefore, pursuant to the present invention at least one temperature sensing unit 22 is embedded in the rubber layer 11 in the region of the tire shoulder.

In the illustrated embodiment, the temperature sensing unit 22 is formed by a transponder having an integrated temperature sensing element. The temperature sensing element can, for example, have a temperature dependent resistor, a temperature dependent capacitor, a temperature dependent inductance, etc. which alters the frequency of a signal given off by the transponder. The sensor element can be integrated directly into the substrate or the base body of the transponder.

A sending and receiving unit 24, which is connected to the vehicle and to an evaluation unit 26, serves for the bi-directional data communication with the temperature sensing unit 22, i.e. the transponder, and for the supply of energy thereto. The construction and function of such transponders are known and will therefore not be explained in detail.

The function of the arrangement of FIG. 1 is as follows: by means of a suitable frequency given off by the sending and receiving device the transponders 22 (a transponder is embedded in the shoulder region on each side of the tire) are supplied with energy and are activated. The transponders send signals having information that prevails in the transponders. These signals are received by the sending and receiving device 24 and are transmitted to the evaluation unit 26. The evaluation unit contains a microprocessor having pertaining storage devices and in a manner known per se, a control panel, an indicator unit, etc. The evaluation unit evaluates the temperature signals sent from the transponders separately for each transponder. If a critical temperature is exceeded, a warning signal is given off. In addition, the temperature data that occurs during operation is stored, so that the time periods during which the tire was at certain temperatures can be evaluated. The damage to the tire is that much greater the longer and higher a temperature is present. In this way, damage can be determined, and a reliable determination is possible relative to the degree of intactness, a preliminary damage, or a damage up to a dangerous state of the tire. The determinations obtained with the inventive system are considerably more valid determinations than the determinations that are possible with conventional compressed air control devices.

The embedment of the temperature sensing elements or transponders 22 in the rubber layer 11 is effected in the mold in which the tire is produced. Depending upon the purpose and expense, a tire can be provided with only one transponder or a plurality of transponders that can be embedded in one or both shoulders of the tire.

The data communication between transponder and sending and receiving device can also be unidirectional whereby the transponder emits continuously or in predetermined time intervals, and is supplied merely with energy from the sending and receiving device.

Figure 2:
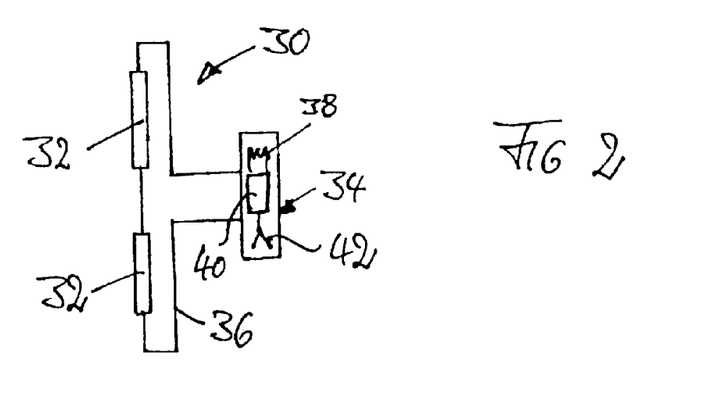
FIG. 2 is a block diagram of temperature sensors connected to a transponder.

FIG. 2 shows a modified embodiment of a temperature sensing unit 30. With the embodiment of FIG. 2, the actual temperature sensing element 32 is spaced from the transponder 34 in the tire. The temperature sensing elements 32 can, for example, be conducting-path elements having a temperature dependent resistance and being embedded in the rubber layer in the region of the tire shoulder and being spaced from one another in the circumferential direction, with the elements being connected to one another via wires 36 that are also embedded in the rubber layer. The wires 36 are, for example, additionally integrated into the sidewalls 14 of the rubber layer, for example being stitched to the carcass 4, and connect the temperature sensing elements 32 with the transponder 34, which is placed and embedded in the radially inner region of the tire bead, for example after the hot vulcanization, so that it is not exposed to the high temperatures that exist during the manufacture of the tire. Visible in FIG. 2 is a receiving antenna 38 of the transponder 34, which serves to supply energy thereto, a microprocessor 40 for the evaluation of the values of the temperature sensing elements 32 and their conversion into transmission signals that are sent via a sending antenna 42. It is to be understood that the sending and receiving antenna could also be combined into a single component that is spaced from the transponder and could, for example, be stitched to the sidewall of the tire.

As can be seen from FIG. 2, a plurality of temperature sensing elements 32 could be embedded in the tire shoulder and could be disposed in series, so that its operating reliability can be monitored via a continuity check.

Figure 3:
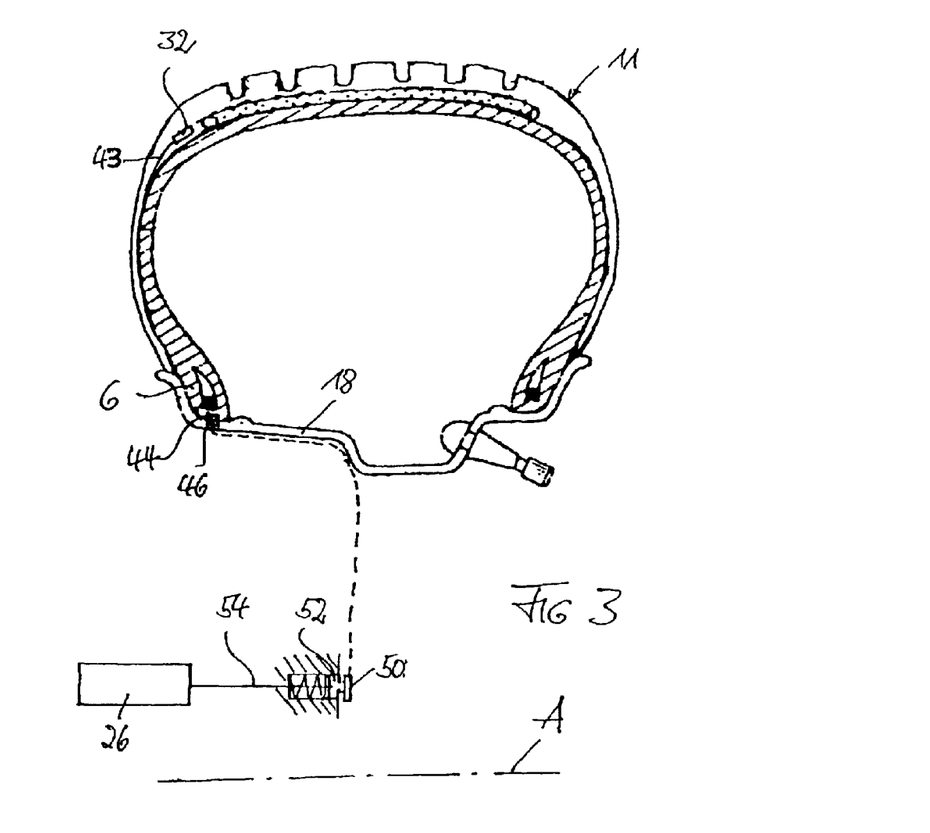
FIG. 3 is a view similar to that of FIG. 1 of a modified embodiment.

FIG. 3 shows a measurement arrangement that operates without transponders and is integrated into the tire.

Pursuant to FIG. 3, a temperature sensing element 32 is integrated into the tire in the region of the shoulder thereof; by means of wires 43 integrated into the rubber layer 11, the temperature sensing element 32 is connected with contacts 44 that are exposed in the region of the bead 6. The contacts 44, which are attached to the tire, are in electrical contact with contacts 46 that are provided on the rim 18. The contacts 46 that are attached to the rim are connected, via conducting paths provided on the rim or on the non-illustrated wheel well, with contact rings 50 that are secured to the wheel and are electrically connected to sliding contacts 52 that are secured to the vehicle, with lines 54 leading from the sliding contacts to an evaluation unit 26. The dot-dash line A indicates the axis of rotation of the wheel.

The arrangement of FIG. 3, which operates via mechanical contacts, can be modified in a number of ways. For example, a plurality of temperature sensing units 32 could be arranged along the periphery of the tire. The temperature sensing elements 32 can operate capacitatively or in other known ways for measuring temperature. The transmission of data between the vehicle wheel and the vehicle need not be effected via sliding rings, that can also be effected inductively, optically, or in any other suitable manner.

The inventive temperature measurement, which permits a brief monitoring of the state of the tire by producing a warning signal if a predetermined temperature is exceeded, and which permits a long term monitoring of the tire, by detecting the temperature stressing of the tire as a time behavior and determines, for example, a time integral of the temperature that is a measure for the tire damage, can be utilized in a vehicle by itself, or can merely be utilized on a tire test stand, where, for example, the temperature of the tire shoulder can be determined as a function of various air pressures and stresses of the tire in order to monitor the quality of the tire. When used in the vehicle itself, the evaluation unit is advantageously integrated into a dashboard or other on-board computer and produces, for example, a warning signal if the tire shoulder temperature is too high as an indication of an air pressure that is too low and/or produces some other warning signal if the tire has, for example during a period of operation, been driven for an impermissively long period of time at a low tire pressure and can therefore be damaged.

Figure 4:
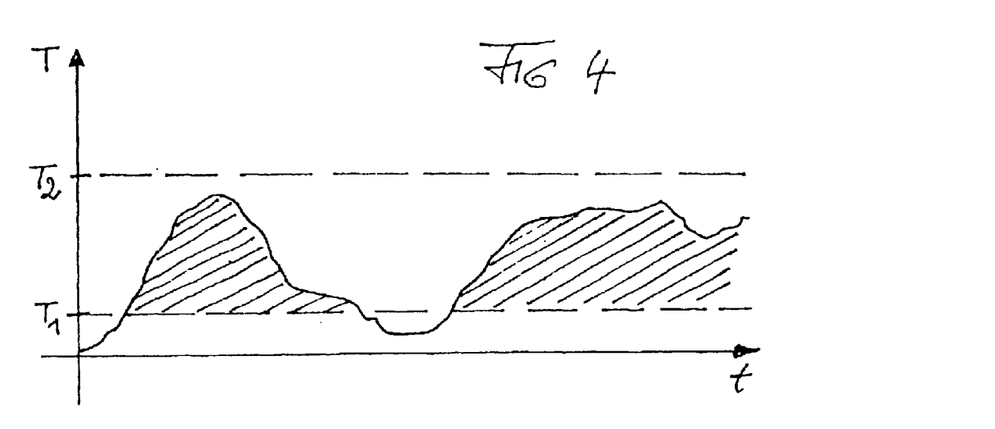
FIG. 4 is a temperature curve for explaining the tire monitoring.

FIG. 4 shows an exemplary temperature curve as it is detected by a temperature sensing element 32. The time t is shown on the abscissa, and the temperature T is provided on the ordinate. During times when the vehicle is not being operated, the temperature drops essentially to the ambient temperature. As the vehicle is being driven, the tire shoulder heats up and the temperature exceeds a lower threshold $T_1$. Depending upon the air pressure in the tire, vehicle speed, stress on the vehicle, route profiles, etc., a temperature curve results that is illustrated as in FIG. 4. An analyzer contained in the evaluation unit 26 integrates the plotted temperature curve over the time whenever the predetermined temperature threshold value $T_1$ is exceeded, with this threshold value being selected such that if it is permanently exceeded it can lead to damage of the tire. Typically, the temperature threshold value $T_1$ is between 60 and 80 degrees, depending upon the tire. Since the damage of the tire on the whole increases superproportionally as the temperature rises, in the computer first a function f(T), for example $f(T)=aT^2+bT$ can be formed, whereby a and b are tire-specific constants, and the function f(T) is then integrated. The "damage story" of the tire is portrayed in the temperature curve, i.e. each temperature that is greater than the temperature threshold value $T_1$ contributes to the tire damage as a function of its duration. If the integral of the curve exceeds a tire-dependent predetermined value, this indicates that the tire is potentially damaged so much that it must be replaced. In conformity therewith, an appropriate output signal appears at a non-illustrated output of the evaluation unit 26. It is to be understood that the curve f(T), which indicates the present tire damage as a function of the temperature, can be determined empirically and can read differently than the example presented.

In FIG. 4, $T_2$ indicates an upper temperature threshold, whereby a tire defect signal is immediately produced if this upper temperature threshold value $T_2$ is exceeded during a predetermined short period of time. The temperature threshold value $T_2$ is selected such that exceeding it leads to an instantaneous damage to the tire, such as separation of carcass and/or belt. A warning relating to an air pressure that is too low can be triggered between the values $T_1$ and $T_2$.

The method and the system described above can be modified in numerous ways. For example, a signal can be supplied to an input of the evaluation unit 26 that indicates that the vehicle is in motion, whereby the evaluation unit now evaluates the output signal of the temperature sensor or sensors when the vehicle is moving. It is to be understood that the respective integral value is stored in a fixed storage means, so that after ignition is terminated, it is maintained, and when evaluation is again undertaken it is further integrated. The function f(T), which is integrated, can, as can the temperature threshold values, be determined on a test stand.

Pursuant to one modified embodiment, the calculation of the integral can be calculated directly upon an IC component that is integrated in the tire. The calculated integral value, as well as the possible exceeding of the critical temperature $T_2$, can, for example, be made evident in a lab, so that it can be recognized there if the tire is damaged. It is furthermore to be understood that the tire curve illustrated in FIG. 4 can be digitally stored, and is then available for an evaluation.

In the event that the evaluation is effected in a vehicle computer, and a respective damage is stored there, when a tire or wheel is replaced, a respective reset must be undertaken so that a correct starting value is associated with each tire.

If an increase of the tire inflation pressure to a maximum value does not lead to a reduction of the temperature that occurs during operation, this means that the vehicle is overloaded or some other failure has occurred.

The temperature sensor that is inventively introduced into the tire can, together with a suitable evaluation unit, be used for a number of further functions, such as:

actuating a fan that cools a tire that is too hot in a defined manner;

triggering a stopping of the engine if the temperature becomes impermissively high;

optimizing the tire characteristics by a control of the tire inflation pressure that is a function of the temperature and driving state;

indicating the necessity of replacing a tire (right away due to a flat tire and only later due to age);

storage of characteristic tire values, such as theoretical temperatures, theoretical inflation pressures as a function of the vehicle load, vehicle speed, etc.

The last-mentioned application, according to which appropriate characteristic tire values are stored on a readable storage means, has the great advantage that by reading the stored characteristic values, appropriate monitoring and control devices that are attached to the vehicle can be adjusted immediately to the corresponding tire.

Pursuant to a simplified embodiment of the tire, or of the electronic component mounted thereon, the temperature sensor can be eliminated and only a storage unit that is preprogrammed at manufacture and is attached to the tire need be provided, with this storage device being readable and the storage values of which, such as permissible maximum speed, tire inflation pressure, manufacturing data, and possibly also the condition of wear, can be indicated in a display that is attached to the vehicle or on a cell phone. Also with such a storage device, that does not, as described, monitor the tire inflation pressure, significant advantages are achieved relative to conventional tires.

Figure 5:
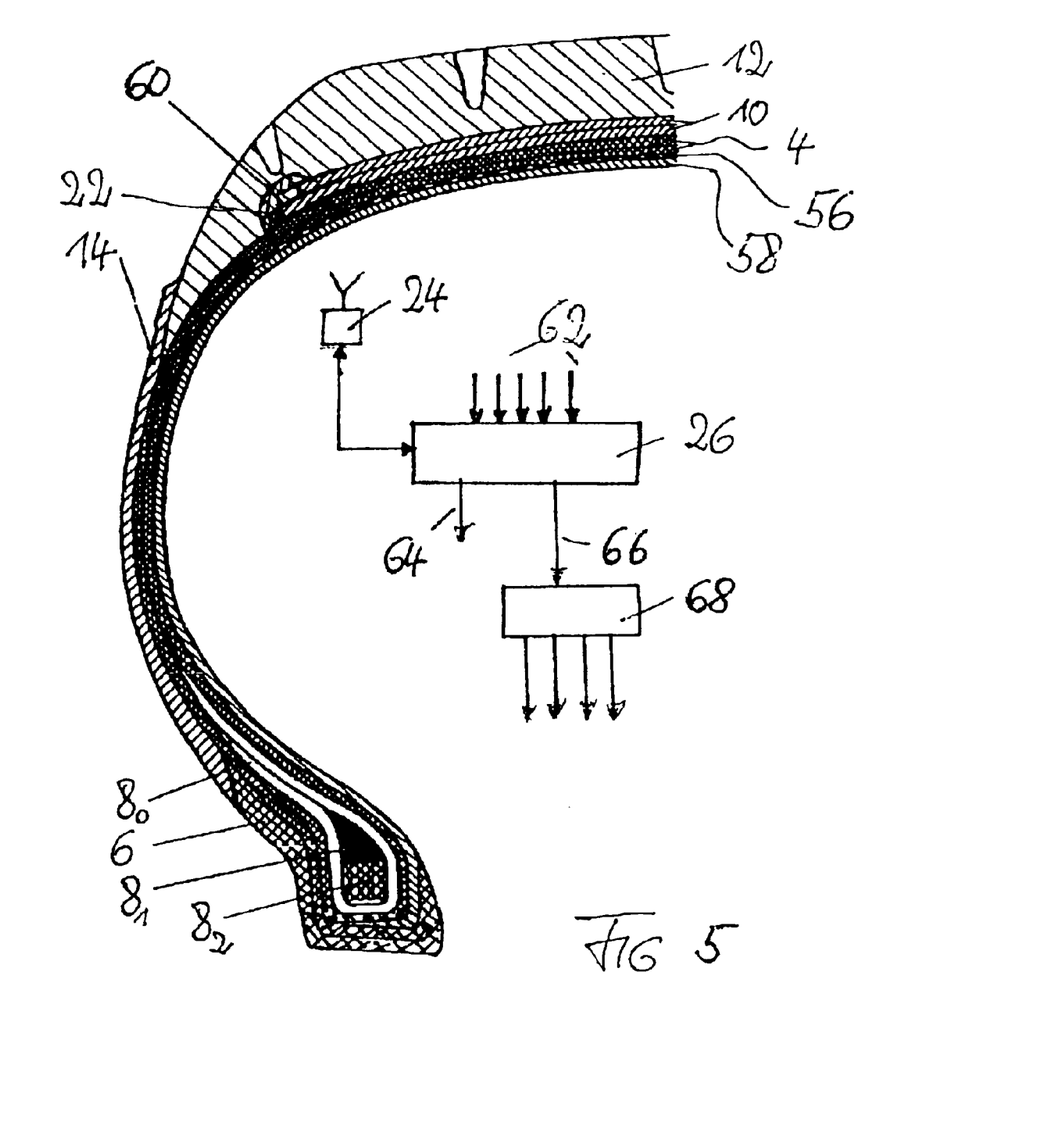
FIG. 5 is a cross-sectional view of a quarter of a further embodiment of a tire, including a block diagram.

FIG. 5 shows a further embodiment of the invention, whereby the construction of a tire is shown in greater detail than in FIG. 1. The tread strip 12 advantageously comprises a different rubber mixture than does the sidewall 14. The belt 10, as does the carcass 4, has a two-ply construction. Disposed within the carcass is a cap ply 56 that is disposed on the outer side of an inner layer 58.

On the radially inner end region of the tire, the sidewall 14 merges into the bead, which radially outwardly covers the core region, which is comprised of a core strip $8_0$, a profiled core member $8_1$, and the actual core $8_2$.

The reference numeral 60 designates the region within which the temperature sensor element or elements 32 (FIG. 2), or the temperature sensor unit 22, are advantageously disposed. In this connection, the temperature sensor can be disposed to the side next to one of the belt plies, for example being stitched to the carcass prior to the vulcanization, or can be disposed in the region between the ending belt plies. The disposition of the temperature sensor element or elements in the region 60 has the advantage that the temperature of the tire can be immediately determined at that location where it is the greatest due to the flexing action, and the serviceability of the tire can be adversely affected. It is to be understood that it is also possible to retrofit the temperature sensor on the inner side of the region 60 on the inner layer 58.

In the embodiment of FIG. 5, the sending and receiving device, which receives the temperature signals, is connected to an evaluation unit 26 that is provided with further inputs 62 that receive, for example, signals corresponding to the vehicle speed, signals corresponding to the vehicle loading, etc. Stored in the evaluation unit 26 is a performance characteristic that stores the optimum tire temperature as a function of the vehicle speed, the vehicle load, and the duration during which the respective speed will be traveled, as well as further parameters that influence the tire temperature, such as the external temperature, wetness of the street, etc. The evaluation unit 26 has two outputs 64 and 66, whereby a warning signal appears at the output 64 if the tire temperature deviates by a certain amount from the temperature stored in the performance characteristic. A control signal appears at the output 66 for a tire air pressure control device 68, which controls a device, the construction of which is known, via which the internal tire pressure can be varied by supplying and removing air. Such tire air pressure changing devices that are actuatable during a driving operation contain an air pump that is attached to the vehicle and that is connected with the interior of the tire via rotary transmission means that are provided between the rim and the wheel support, whereby an electrically controllable valve is disposed in the respective connecting line. If the temperature is above a theoretical value, the air pressure is increased. If the temperature is below the theoretical value, the air pressure is reduced. This ensures that the vehicle is always operated with the air pressure at which the tire has its optimum characteristics. It is to be understood that the system of FIG. 5 on the whole has a four-channel configuration, i.e. the air pressure of each tire is controlled by monitoring the tire pressure. It is furthermore to be understood that with the arrangement of FIG. 5, it is possible to utilize the embodiments of the temperature monitoring device of FIG. 1, 2 or 3. The most advantageous position for mounting the temperature sensor is the tire rubber in the region of the tire shoulder near the carcass and/or the belt. However, the temperature sensor, or in particular a data storage means having tire characteristic values, can also be mounted on the inner side of the tire in the region of the shoulder or the tread surface by adhesive means or vulcanization.

With the aid of FIG. 6, a method for the subsequent introduction of a temperature sensor element 32 into a tire will now be explained.

Figure 6A:
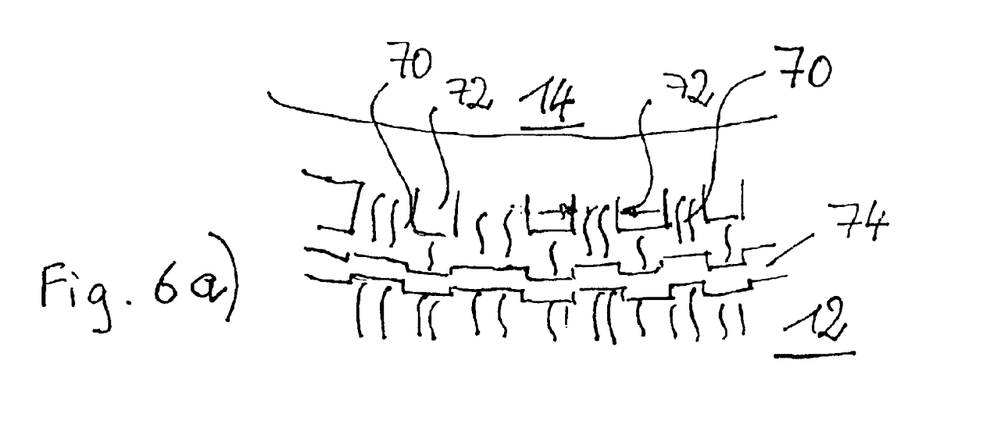
FIGS. 6a–6c are sketches to explain an inventive method for the subsequent mounting of a temperature sensor on a tire.
Figure 6B:
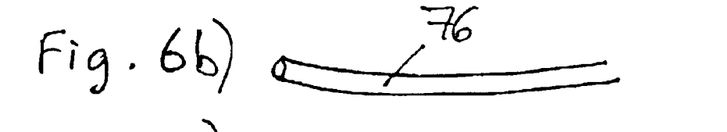
Figure 6C:
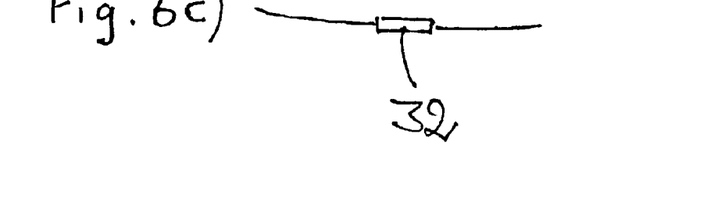

FIG. 6a illustrates a perspective partial view of a tire shoulder. In the region of the transition between the sidewall 14 and the tread strip 12, the tread strip is provided with raised tread portions 70 and between these tread recesses 72 that are spaced apart in the circumferential direction of the tire. Provided toward the middle of the tire is a circumferentially extending groove 74 that is adjoined by further tread regions and grooves. The curved lines represent slits or sipes in the tread strip that improve the traction thereof.

For the introduction of a temperature sensor element 32 (FIG. 6c), one of the raised tread portions 70 is first bored from both sides, in the direction of the arrows, such that the bores meet in the interior of the rubber at the belt or the carcass. From one side, an advantageously somewhat flexible narrow tube (FIG. 6b) is then pushed through the bores that form a channel, whereby the front end of the tube can cut through the connection between the two bores. Subsequently, the temperature sensor element 32 is inserted into the tube 76, and by means of one of its connection wires is held in the desired deepest position of the channel, or at the connection location of the bores, while the tube 76 is withdrawn. The temperature sensor element is advantageously already coated prior to its insertion with a vulcanization agent or an adhesive. After removal of the tube 76, additional vulcanization agents or an adhesive are introduced into the bores, so that the sensor element 32 is tightly and reliably accommodated in the tire. The connection wires are guided by stitching and/or by being recessed in previously formed grooves, to connections that are provided, for example, on the rim.

It is advantageous if the channel, i.e. the bores, extend in the circumferential direction of the tire because the sensor elements and its connection wires are then subjected to only slight deformations if the tire is deformed in the region of its shoulder.

The described method, which is particularly suitable, for example, for the outfitting of tires for test stand or street tests, can be modified in numerous ways. For example, the sensor element can be a transponder without connecting lines. For the insertion into the tube 76 and the holding, a flexible small rod can then suffice. In many cases, it is sufficient to provide only one bore that again advantageously extends in the circumferential direction of the tire and leads from one surface location to a deeper location in the vicinity of the carcass.

Of great importance for a satisfactory operation of the temperature sensors are the lines that are used with which the temperature sensors, storage elements or other electronic components that are embedded in the tire are connected to an antenna that is spaced therefrom, a sliding ring, or some other contact location, and in particular not only in the case of a laboratory equipping of the tire with a temperature measurement device, for example as in FIGS. 2 and 3, or with a subsequent equipping pursuant to FIG. 5. Examples for contact lines are a thin, flexible steel cord, for example of stainless steel, having a cross-sectional surface area of, for example, 0.3 mm$^2$, a carbon-aramid filament whereby the carbon fibers serve for conducting current and the aramid fibers ensure the required mechanical fatigue strength, or other synthetic fibers or filaments having electrical conductivity. The connection of the connecting lines with the temperature sensor or other electronic components can be effected in a known manner, for example by crimping, soldering, etc.

The specification incorporates by reference the disclosure of German priority documents DE 101 35 883.0 filed Jul. 24, 2001 and DE 101 56 776.6 filed Nov. 19, 2001.

The present invention is, of course, in no way restricted to the specific disclosure of the specification and drawings, but also encompasses any modifications within the scope of the appended claims.

What is claimed is:

1. A method for monitoring the operational reliability of a vehicle tire, including:
    embedding at least one temperature sensor in a shoulder region of the vehicle tire,
    transmitting an output signal of said at least one temperature sensor to an evaluation unit, and
    evaluating said output signal in said evaluation unit with regard to at least one of magnitude and trend with respect to time, wherein said output signal, or a function that is dependent upon said output signal, is integrated in said evaluation unit, wherein a value of an integral thereof is stored and indicates a wear signal if the value of said integral exceeds a predetermined threshold value.

2. A method according to claim 1, wherein said output signal, or a temperature that is dependent upon said output signal, is integrated only if a temperature determined by said at least one temperature sensor is above a threshold temperature value.

3. A method according to claim 1, further comprising transmitting a signal from the evaluation unit to a tire air pressure control device coupled to the vehicle tire via rotary transmission means when the temperature of said vehicle tire exceeds a predetermined value at predetermined driving conditions, wherein the tire air pressure control device comprises an air pump and the tire air pressure control device causes the air pump to increase the inflation pressure of said vehicle tire.

4. A vehicle tire comprising:
    at least one temperature sensor embedded in a shoulder region of said tire, wherein said at least one temperature sensor is connected with contact means via electrical lines that are embedded in said tire, and wherein said contact means are exposed for contact with contacts provided on a rim, and
    a transmission device for transmitting an output signal of said at least one temperature sensor from said contacts provided on the rim to a location externally of said tire.

5. A vehicle tire according to claim 4, wherein said at least one temperature sensor is embedded in rubber of said tire in the vicinity of a shoulder of said tire.

6. A vehicle tire according to claim 4, wherein said at least one temperature sensor is connected with a transponder that is embedded in said tire and that has an output signal that is a function of the temperature detected by said at least one temperature sensor.

7. A vehicle tire according to claim 6, wherein said at least one temperature sensor is integrated in said transponder.

8. A vehicle tire according to claim 6, wherein tire-specific data is stored in said transponder.

9. A vehicle tire according to claim 6, wherein said transponder is embedded in said tire at a location close to a bead of said tire.

10. A method of introducing a temperature sensor into a vehicle tire, including the steps of:
    forming a channel in rubber of a tire, wherein said channel proceeds from a first location on a surface of said tire, through said tire rubber to a measurement location in a vicinity of at least one of a belt of said tire and a carcass of said tire in a region of a tire shoulder, and to a second location on a surface of said tire that is remote from said first location,
    introducing a tube into said channel,
    introducing a temperature sensor into said tube such that said temperature sensor is disposed in the region of said measurement location,
    removing said tube from said channel while holding said temperature sensor in place, and
    closing off said channel with said temperature sensor therein.

11. A method according to claim 10, wherein said channel on the whole extends in a circumferential direction of said tire.

12. A method comprising:
    measuring the temperature of at least one vehicle tire over time using at least one temperature sensor embedded in a shoulder region of the at least one vehicle tire, wherein a temperature signal representative of the measured temperature is generated by the at least one temperature sensor,
    transmitting the temperature signal to an evaluation unit,
    integrating the temperature signal with respect to time, thereby generating an integral value,
    storing the integral value,
    determining whether the stored integral value exceeds a predetermined threshold value, and
    indicating a warning when the stored integral value exceeds the predetermined threshold value.

13. A method according to claim 12, wherein the temperature signal is integrated in the evaluation unit only when the temperature represented by the temperature signal is greater than a predetermined temperature.

14. A method according to claim 12, wherein the temperature signal is wirelessly transmitted to said evaluation unit.

15. A method according to claim 12, wherein the temperature signal is transmitted to said evaluation unit via sliding contacts.

16. A method according to claim 12, further comprising:
    transmitting a tire pressure increase signal from the evaluation unit to a tire air pressure control device, which comprises an air pump coupled to the at least one vehicle tire via rotary transmission means, when the temperature signal of the at least one vehicle tire exceeds a predetermined temperature value, and
    after receipt of the tire pressure increase signal by the air tire pressure control device, activating the air pump so as to increase the inflation pressure of the at least one vehicle tire.

17. A method according to claim 12, further comprising receiving at least one signal in the evaluation unit representative of at least one of vehicle speed and vehicle loading, wherein said predetermined threshold value is selected based upon said stored integral value and the at least one of vehicle speed and vehicle loading.

18. A method according to claim 17, further comprising:
    when the temperature of the at least one vehicle tire crosses a predetermined value, transmitting a tire pressure adjusting signal from the evaluation unit to a tire air pressure control device coupled to the at least one tire, wherein the tire air pressure control device is activated to adjust the inflation pressure of the at least one vehicle tire.

19. A method according to claim 18, wherein said temperature signal is integrated in the evaluation unit only when the temperature represented by the temperature signal is greater than a predetermined temperature.

20. A method according to claim 12, wherein the at least one temperature sensor is selected from the group consisting of a temperature dependent resistor, a temperature dependent capacitor and a temperature dependent inductor.

21. An apparatus comprising:

at least one temperature sensor embedded in a shoulder region of at least one vehicle tire, the at least one temperature sensor being arranged and constructed to transmit a temperature signal representative of the measured temperature, and an evaluation unit arranged and constructed to:

receive the transmitted temperature signal, integrate the transmitted temperature signal with respect to time, thereby generating an integral value, store the integral value, determine whether the stored integral value exceeds a predetermined threshold value, and indicate a warning when the stored integral value exceeds the predetermined threshold value.

22. An apparatus according to claim 21, wherein the evaluation unit is arranged and constructed to integrate the temperature signal only when the temperature represented by said temperature signal is greater than a predetermined temperature.

23. An apparatus according to claim 21, wherein the at least one sensor is arranged and constructed to wirelessly transmit the temperature signal to the evaluation unit.

24. An apparatus according to claim 21, further comprising sliding contacts arranged and constructed to transmit the temperature signal from the at least one temperature sensor to the evaluation unit.

25. An apparatus according to claim 21, further comprising a tire air pressure control device, which comprises an air pump coupled to the at least one vehicle tire via rotary transmission means, wherein the evaluation unit is arranged and constructed to transmit a tire pressure increase signal to tire pressure control device when the temperature signal of the at least one vehicle tire exceeds a predetermined temperature value and tire air pressure control device is arranged and constructed to cause the air pump to increase the inflation pressure of the at least one vehicle tire after receipt of the tire pressure increase signal.

26. An apparatus according to claim 21, further comprising at least one sensor arranged and constructed to transmit to the evaluation unit at least one signal representative of at least one of vehicle speed and vehicle loading, wherein the evaluation unit is arranged and constructed to select the predetermined threshold value based upon the stored integral value and the at least one of the vehicle speed the vehicle loading.

27. An apparatus according to claim 26, further comprising a tire air pressure control device coupled to the at least one tire, the evaluation unit being arranged and constructed to transmit a tire pressure adjusting signal to the tire air pressure control unit when the temperature of the at least one vehicle tire crosses a predetermined value, wherein the tire air pressure control device is arranged and constructed to adjust the inflation pressure of the at least one vehicle tire after receipt of the tire pressure adjusting signal.

28. An apparatus according to claim 27, wherein the evaluation unit is arranged and constructed to integrate the temperature signal only when the temperature represented by said temperature signal is greater than a predetermined temperature.

29. An apparatus according to claim 21, wherein the at least one sensor is selected from the group consisting of a temperature dependent resistor, a temperature dependent capacitor and a temperature dependent inductor.

* * * * *